(12) United States Patent
Mizuno (10) Patent No.: US 6,786,843 B2
(45) Date of Patent: Sep. 7, 2004

(54) CYLINDER FOR AUTOMATIC TRANSMISSION

(75) Inventor: Shigeharu Mizuno, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/252,091

(22) Filed: Sep. 23, 2002

(65) Prior Publication Data

US 2003/0064848 A1 Apr. 3, 2003

(30) Foreign Application Priority Data

Sep. 28, 2001 (JP) ........................................ 2001-303908

(51) Int. Cl.[7] .............................. B60G 11/02; F16F 1/18; F16D 19/00; F16D 25/00
(52) U.S. Cl. .................. 475/120; 192/85 AA; 267/36.1
(58) Field of Search ..................... 192/85 AA; 267/36.1, 267/41, 53; 475/346–347, 120, 121; 74/606 R (56) References Cited

U.S. PATENT DOCUMENTS

| | | | | |
|---|---|---|---|---|
| 3,237,739 A | * | 3/1966 | Pritchard .................. | 192/99 A |
| 3,861,502 A | * | 1/1975 | Hiramatsu et al. ....... | 188/196 V |
| 4,257,510 A | * | 3/1981 | Fisher ....................... | 192/207 |
| 4,690,037 A | * | 9/1987 | Sumiya et al. ............ | 92/130 R |
| 4,735,111 A | * | 4/1988 | Hayakawa et al. ......... | 475/146 |
| 4,945,782 A | | 8/1990 | Farrell | |
| 5,328,008 A | * | 7/1994 | Sano ......................... | 192/17 R |
| 5,388,678 A | * | 2/1995 | Murata ...................... | 192/3.29 |
| 5,860,885 A | * | 1/1999 | Mizuta ....................... | 475/116 |
| 5,865,289 A | * | 2/1999 | Ishimaru ................... | 192/87.11 |
| 5,879,259 A | | 3/1999 | Teraoka et al. | |
| 5,893,445 A | * | 4/1999 | Dover .................... | 192/85 AA |
| 5,992,834 A | * | 11/1999 | Dover ........................ | 267/178 |
| 6,000,514 A | * | 12/1999 | Okada ...................... | 192/70.21 |
| 6,513,636 B2 | * | 2/2003 | Han et al. ............... | 192/85 AA |
| 6,561,943 B1 | * | 5/2003 | Bae ............................ | 475/320 |

OTHER PUBLICATIONS

Mitsubishi Heavy Industries, Technical Report, vol. 21, No. 1, Jan. 1984, 7 Sheets.

* cited by examiner

Primary Examiner—Tisha D Lewis
(74) Attorney, Agent, or Firm—Foley & Lardner LLP

(57) ABSTRACT

In a structure for an automatic transmission wherein a brake is arranged in a casing, a hydraulic servomechanism for actuating the brake includes a cylinder, a piston, a return spring for biasing the piston and including an annular portion abutting on the piston and a plurality of leaf-spring portions protruding outward equiangularly from the outer periphery of the annular portion, and a plurality of pressing portions formed with the piston and abutting on the servomechanism through clearances between the leaf-spring portions of the return spring.

5 Claims, 5 Drawing Sheets

| INPUT | REDUCTION PLANETARY-GEAR CARRIER | REDUCTION PLANETARY-GEAR CARRIER | INPUT SHAFT | RAVIGNEAUX CARRIER | RAVIGNEAUX SUN GEAR 11 | RAVIGNEAUX CARRIER |
|---|---|---|---|---|---|---|
| OUTPUT | RAVIGNEAUX SUN GEAR 11 | RAVIGNEAUX SUN GEAR 12 | RAVIGNEAUX CARRIER | CASING | CASING | CASING |
|  | LOW/C | 3-5-R/C | H/C | L&R/B | 2-6/B | LOW O.W.C |
| P |  |  |  |  |  |  |
| REV |  | ○ |  | ○ |  |  |
| N |  |  |  |  |  |  |
| 1ST | ○ |  |  | (○) |  | ○ |
| 2ND | ○ |  |  |  | ○ |  |
| 3RD | ○ | ○ |  |  |  |  |
| 4TH | ○ |  | ○ |  |  |  |
| 5TH |  | ○ | ○ |  |  |  |
| 6TH |  |  | ○ |  | ○ |  |

FIG.4

FIG.5 cylinder for automatic transmission

BACKGROUND OF THE INVENTION

The present invention relates to cylinders for an automatic transmission, and more particularly, to the cylinders including a disk-like return spring.

One of the cylinders of this type is described, for example, in MITSUBISHI HEAVY INDUSTRIES Technical Report, Vol. 21 No. 1 published in January 1984. This cylinder comprises a multiplate brake arranged on the inner peripheral surface of a transmission casing and a hydraulic servomechanism arranged on the left of the multiplate brake for controlling operation of the brake. The hydraulic servomechanism comprises a cylinder formed with a support wall of the inner peripheral surface of the transmission casing, a piston slidably disposed in the cylinder, a disk-like return spring interposed between the piston and a frictional coupling member of the multiplate brake and having an annular inclined face.

With the above cylinder, however, the piston presses the frictional coupling member of the multiplate brake through the return spring, so that when hydraulic oil with a predetermined pressure is supplied to a hydraulic chamber defined by the cylinder and the piston upon engagement of the brake, the piston is moved immediately, whereas as being pressed through the return spring, the frictional coupling member has a response lag by elastic deformation of the return spring.

Moreover, since the return spring comprises a single leaf spring having an annular inclined face, adjustment of the characteristic of the leaf spring needs to change the thickness thereof. This requires full replacement of the leaf spring, i.e. provision of various return springs having characteristic adjusted, leading to the increased number of parts.

SUMMARY OF THE INVENTION

It is, therefore, an object of the present invention to provide cylinders for an automatic transmission, which contribute to an enhancement in the response characteristic of a mechanism to be actuated by a piston and a facilitation of adjustment of a disk-like return spring.

The present invention provides generally a structure for an automatic transmission wherein a mechanism is arranged in a casing having an inner periphery formed with a spline, the structure comprising: a cylinder; a piston slidably arranged in the cylinder, the piston actuating the mechanism; a return spring that biases the piston, the return spring comprising an annular portion abutting on the piston and a plurality of leaf-spring portions protruding outward equiangularly from an outer periphery of the annular portion and having a front end engaged with the spline of the casing; and a plurality of pressing portions formed with the piston, the pressing portions abutting on the mechanism through clearances between the leaf-spring portions of the return spring.

BRIEF DESCRIPTION OF THE DRAWINGS

The other objects and features of the present invention will become apparent from the following description with reference to the accompanying drawings, wherein.

DETAILED DESCRIPTION OF THE INVENTION

Referring to the drawings, an embodiment of a cylinder for an automatic transmission is described, wherein the present invention is applied to an automatic transmission with a change gear.

Figure 1:
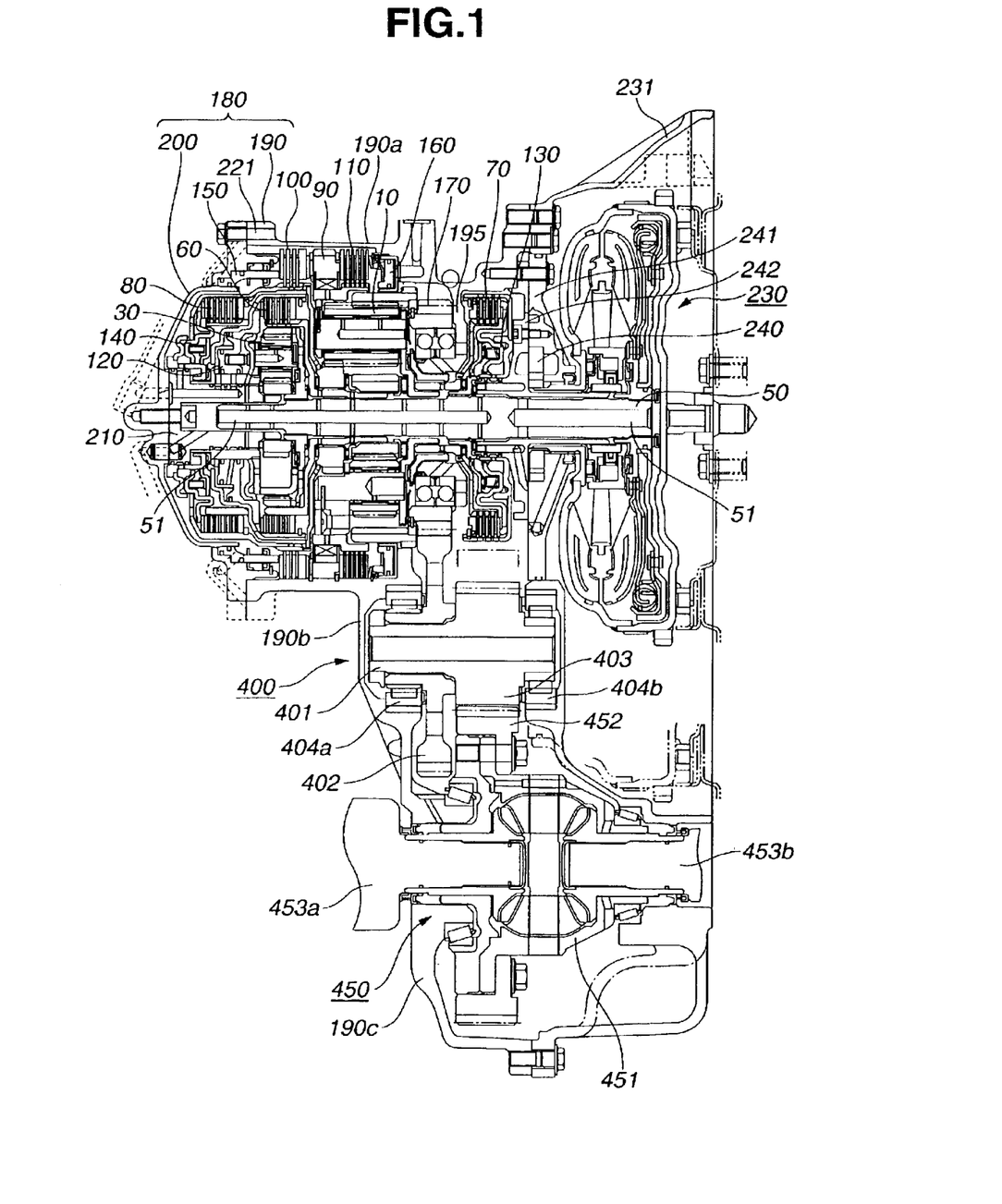
FIG. 1 is a longitudinal section of an automatic transmission to which the present invention is applied.
Figure 2:
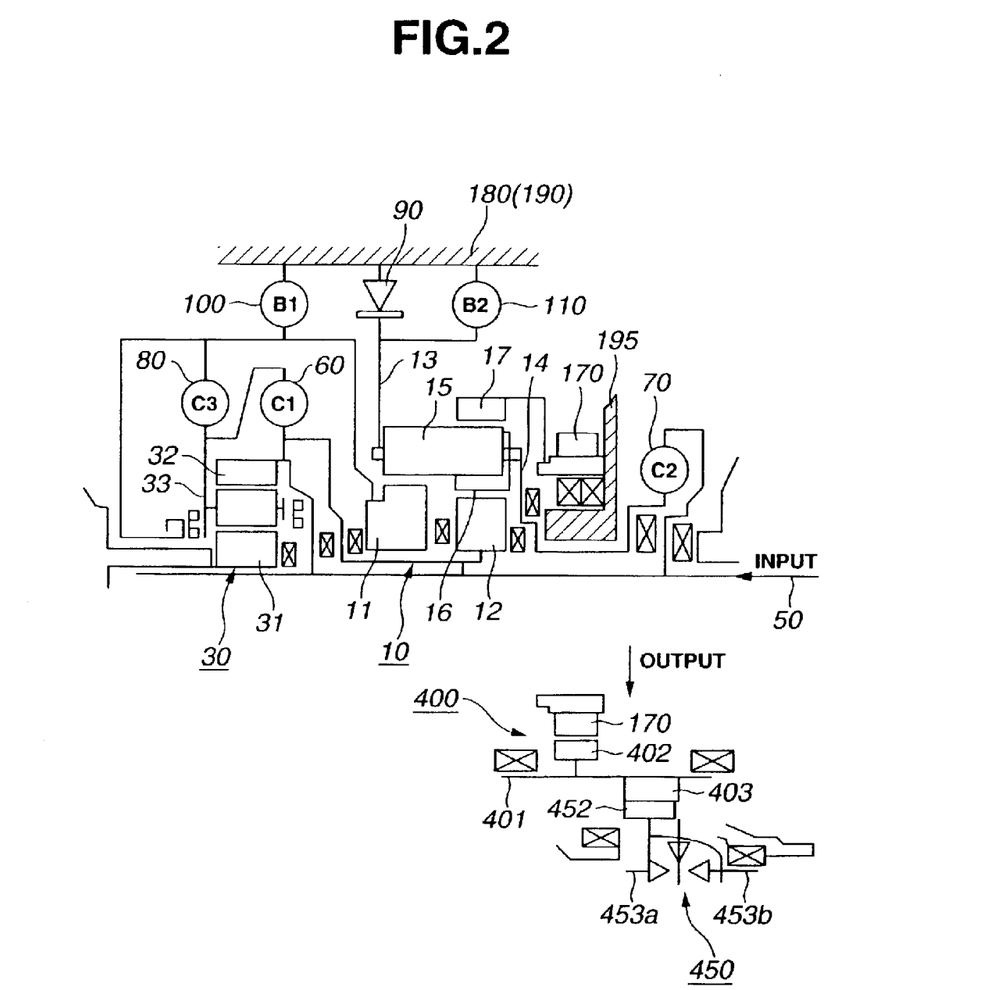
FIG. 2 is a block diagram showing a gear train of the automatic transmission.

Referring to FIGS. 1–2, the automatic transmission, having a triaxial structure so called, is in the form of a transverse transaxle for a front-engine front-drive (FF) vehicle or a rear-engine rear-drive (RR) vehicle, and includes as a speed-change mechanism a gear train for achieving six forward speeds and one reverse. The transmission comprises in a transmission casing 180 an input or first shaft 50 disposed parallel to each other, a counter or second shaft 401, drive or third shafts 453*a*, 453*b*, and various elements, such as a speed-change unit and a gear, disposed on the shafts.

The input shaft 50 receives torque from an engine, not shown, through a torque converter 230, and has an output side on the torque converter 230. The counter shaft 401 is disposed parallel to the input shaft 50, and includes a counter gear 400 meshed with an output gear of the input shaft 50. A final gear 452 to which torque is transferred through the counter gear 400 of the counter shaft 401 is provided to a differential casing 451 for supporting the drive shafts 453*a*, 453*b*.

As shown in FIGS. 1–2, the automatic transmission includes speed-change unit arranged around the input shaft 50. The speed-change unit comprises a Ravigneaux-type first planetary-gear set 10 which inputs reduced rotation and non-reduced rotation of the input shaft 50 to output a plurality of changed rpm, a Ravigneaux-type second planetary-gear set 30 which reduces and outputs rotation of the input shaft 50, first and third clutches 60, 80 interposed between two sun gears 11, 12 of the second and first planetary-gear sets 30, 10 in an engageable and disengageable way, a second clutch 70 interposed between the input shaft 50 and a carrier 14 of the first planetary-gear set 10 in an engageable and disengageable way, first and second brakes 100, 110 which provide braking forces to the sun gear 11 and a carrier 13 of the first planetary-gear set 10, and a one-way clutch 90 arranged parallel to the second brake 110. The automatic transmission also comprises first and second hydraulic servomechanisms 120, 130 and a third hydraulic servomechanism 140 disposed corresponding to the first and second clutches 60, 70 and the third clutch 80, and fourth and fifth hydraulic servomechanisms 150, 160 disposed corresponding to the first and second brakes 100, 110.

The first, second and third clutches 60, 70, 80 and the first and second brakes 100, 110 are of the multiplate structure comprising a frictional member. The first clutch 60 is disposed in the vicinity of the outer periphery of the second planetary-gear set 30, and the third clutch 80 is disposed in the vicinity of the rear thereof. The second clutch 70 is disposed at a front end of the transmission casing 180. The first brake 100 is disposed between the first clutch 60 and the inner periphery of the transmission casing 180, and the second brake 110 is disposed between the first planetary-gear set 10 and the inner periphery of the transmission casing 180. The one-way clutch 90 is disposed between the first and second brakes 100, 110.

The first, second, third, fourth and fifth hydraulic servomechanisms 120, 130, 140, 150, 160 are constructed to carry out engagement and disengagement of the first, second and third clutches 60, 70, 80 and the first and second brakes 100, 110 by the hydraulic pressures derived from control valves.

The first planetary-gear set 10 is disposed in the vicinity of the rear of a counter drive gear 170 as shown in FIG. 1, and comprises four speed-change elements of large-diameter sun gear 11, small-diameter sun gear 12, carriers 12, 14, and ring gear 17 as shown in FIG. 2. The first planetary-gear set 10 is of the Ravigneaux type wherein a long pinion 15 is meshed with the large-diameter sun gear 11, a short pinion 16 is meshed with the small-diameter sun gear 12, and the long pinion 15 is meshed with the inner teeth of the ring gear 17.

The large-diameter and small-diameter sun gears 11, 12 constitute an input element of reduced rotation for receiving input from the input shaft 50 through the second planetary-gear set 30. Specifically, the small-diameter sun gear 12 is coupled to the first clutch 60 to receive input from the second planetary-gear set 30, whereas the large-diameter sun gear 11 is coupled to the third clutch 80 to receive input from the second planetary-gear set 30. The large-diameter sun gear 11 can be fixed to the transmission casing 180 by the first brake 100.

The carriers 13, 14 support the long and short pinions 15, 16 meshed with each other, and constitute an input element of non-reduced rotation for receiving direct input from the input shaft 50. The carrier 14 is coupled to the input shaft 50 through the second clutch 70, whereas the carrier 13 can be fixed to the transmission casing 180 by the second brake 110. The one-way clutch 90 allows the transmission casing 180 to rotate in one direction.

The one-way clutch 90 has an engagement direction set to the reaction-torque supporting direction at the first speed to fulfill the function of the second brake 110. The ring gear 17 constitutes an output element, and is coupled to the counter drive gear 170 which is located between the first planetary-gear set 10 and the second clutch 70, and is rotatably supported by an intermediate partition 195 separated from the input shaft 50 as will be described later.

The second planetary-gear set 30 is disposed in the vicinity of the rear of the first planetary-gear set 10 as shown in FIG. 1, and comprises three speed-change elements of a sun gear 31, a ring gear 32, and a carrier 33 as shown in FIG. 2. In the second planetary-gear set 30, the sun gear 31 is fixed to a sleeve member 210 formed with a side cover 200 of the transmission casing 180 as will be described later, the ring gear 32 as input element is coupled to the input shaft 50, and the carrier 33 as output element is coupled to the first planetary-gear set 10 through the first and second clutches 60, 70.

The counter gear 400 comprises a large-diameter counter driven gear 402 meshed with the counter drive gear 170 of the input shaft 50 fixed to a rear end of the counter shaft 401 disposed parallel to the input shaft 50 and having the shorter length than the input shaft 50, and a small-diameter differential drive pinion gear 403 as output element fixed to the counter shaft 401 in front of the counter driven gear 402. The counter shaft 401 has both ends rotatably supported by first and second bearings 404a, 404b. The counter gear 400 reduces and reverses output of the input shaft 50 through the counter driven gear 402 and the differential drive pinion gear 403, which is transferred to a differential gear 450, achieving an appropriate reduction ratio.

The differential gear 450 is constructed so that the final gear 452 fixed to the differential casing 451 is meshed with the differential drive pinion 403 of the counter gear 400 to output differential rotation of a differential gear disposed in the differential casing 451 to the right and left drive shafts 453b, 453a. The differential gear 450 is supported by the transmission casing 180 and a converter housing 231 mounted to a front end thereof.

The transmission casing 180 is of the shape that allows accommodation of the input shaft 50 and its elements mounted thereto, the counter gear 400, and the differential gear 450. The transmission casing 180 comprises a main body 190 and side cover 200 for concealing a rear end thereof. The main body 190 is formed like a cylinder by a peripheral wall shaped optimally to accommodate the elements disposed on the shafts. Specifically, the main body 190 comprises a cylindrical first shaft compartment 190a for concealing the outer periphery of the input shaft 50 for accommodation thereof, a second shaft compartment 190b continuously provided to the upper-right portion of the first shaft compartment 190a for concealing the outer periphery and rear end face of the counter shaft 401 for accommodation thereof, and a third shaft compartment 190c provided to the lower-right portion of the first shaft compartment 190a for concealing the outer periphery of the drive shaft 453a for accommodation thereof.

Accommodated in the first shaft compartment 190a is the speed-change unit comprising first and second planetary-gear sets 10, 30, first, second and third clutches 60, 70, 80, and first and second brakes 100, 110. The counter drive gear 170 as output gear is arranged in front of the speed-change unit. Accommodated in the second shaft compartment 190b is only the counter gear 400 comprising counter driven gear 402 meshed with the counter drive gear 170 and drive pinion gear 403 arranged in front thereof. Thus, a rear end of the first shaft compartment 190a has a larger backward protrusion than that of the second shaft compartment 190b. The roughly disk-like side cover 200 is mounted to the first shaft compartment 190a on the rear end face with an opening through bolts 221.

The second shaft compartment 190b rotatably supports an end of the counter shaft 401 through the first bearing 404a mounted to the inner face of the compartment 190b in a portion for concealing the rear end face of the counter shaft 401. The third shaft compartment 190c has an opening formed in the second shaft compartment 190b in a portion for concealing the rear end face of the counter shaft 401, through which the drive shaft 53a extends outward.

Mounted to the side cover 200 on the inner face is the sleeve member 210 for rotatably supporting the input shaft 50 and also supporting the first and third clutches 60, 80 and the second planetary-gear set 30.

Figure 3:
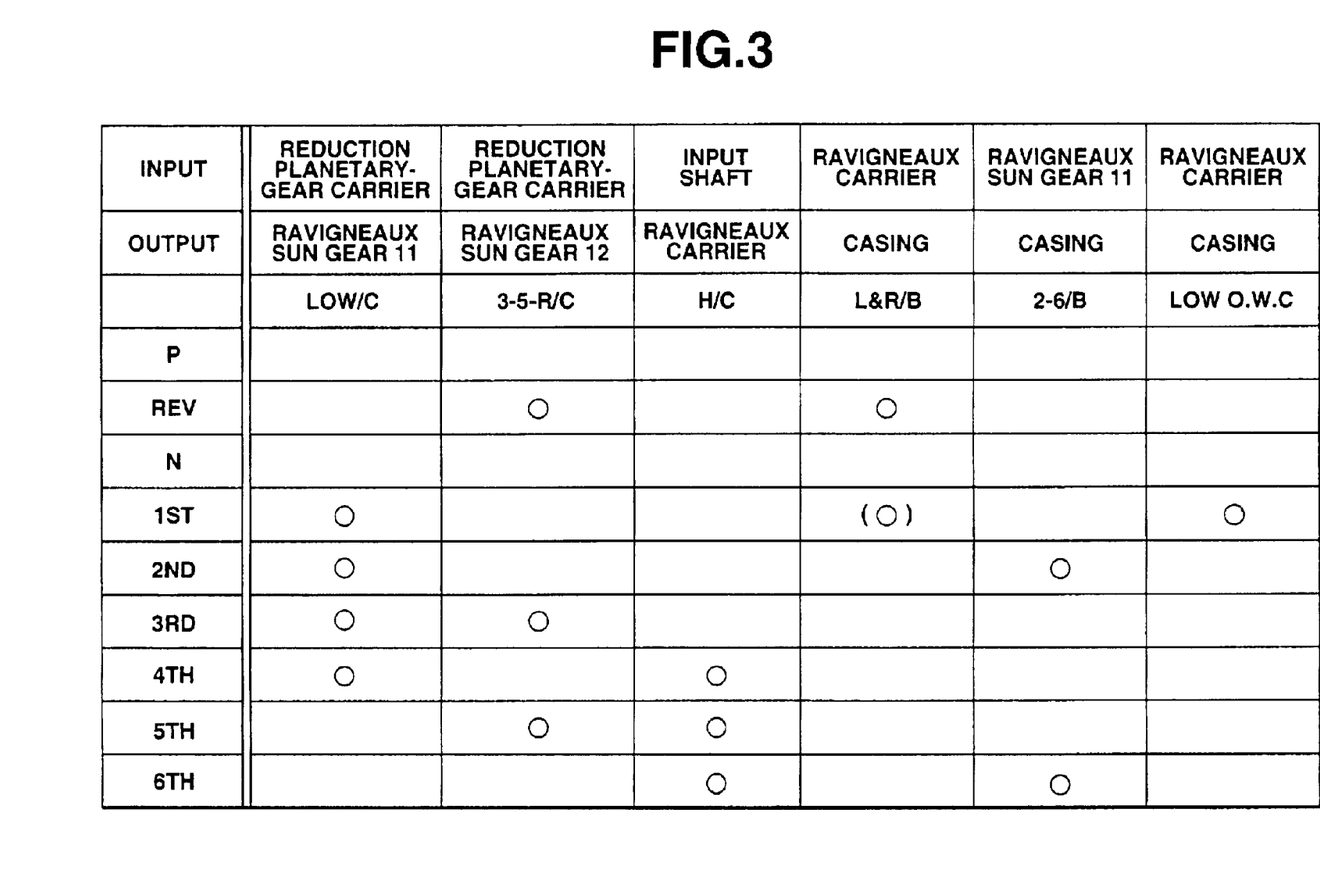
FIG. 3 is a table illustrating operation of the automatic transmission.

Under control of an electronic control unit and a hydraulic control unit, not shown, the automatic transmission having the above constitution carries out shifting in the range of speeds or six forward speeds 1ST–6TH and one reverse REV in accordance with a vehicle load. Operation of the automatic transmission when carrying out six forward speeds 1ST–6TH and one reverse REV is described below. FIG. 3 diagrammatically shows the speeds achieved by engagement and disengagement of the clutches and brakes, wherein a cellule with circle designates engagement, and a cellule with no circle designates disengagement.

The first speed 1ST is achieved by engagement of the first clutch 60 and the one-way clutch 90. At the first speed 1ST, reduced rotation of the input shaft 50 through the second planetary-gear set 30 is input to the small-diameter sun gear 12 through the first clutch 60. Receiving a reaction from the carrier 14 fixed to the transmission casing 180 by engagement of the one-way clutch 90, reduced rotation of the ring gear 17 at the maximum reduction ratio is output to the counter drive gear 170. During engine coasting, reaction torque to the carrier 13 is reversed, so that the second brake 110 is engaged as shown by a parenthesized circle in FIG. 3.

The second speed 2ND is achieved by engagement of the first clutch 60 and the first brake 100. At the second speed 2ND, reduced rotation of the input shaft 50 through the second planetary-gear set 30 is input to the small-diameter sun gear 12 through the first clutch 60. Receiving a reaction from the large-diameter sun gear 11 fixed to the transmission casing 180 by engagement of the first brake 100, reduced rotation of the ring gear 17 is output to the counter drive gear 170. The reduction ration at the second speed 2ND is smaller than that at the first speed 1ST.

The third speed 3RD is achieved by simultaneous engagement of the first clutch 60 and the third clutch 80. At the third speed 3RD, reduced rotation of the input shaft 50 through the second planetary-gear set 30 is simultaneously input to the large-diameter sun gear 11 and the small-diameter sun gear 12 through the third clutch 80 and the first clutch 60, achieving direct coupling of the first planetary-gear set 10. Thus, rotation of the ring gear 17, which is the same rotation as that input to the sun gears 11, 12, but reduced rotation with respect to rotation of the input shaft 50, is output to the counter drive gear 170.

The fourth speed 4TH is achieved by simultaneous engagement of the first clutch 60 and the second clutch 70. At the fourth speed 4TH, reduced rotation of the input shaft 50 through the second planetary-gear set 30 is input to the small-diameter sun gear 12 through the first clutch 60, whereas non-reduced rotation of the input shaft 50 through the second clutch 70 is input to the carrier 14. Intermediate rotation between the two rotations, i.e. rotation of the ring gear 17 slightly reduced with respect to rotation of the input shaft 50, is output to the counter drive gear 170.

The fifth speed 5TH is achieved by simultaneous engagement of the second clutch 70 and the third clutch 80. At the fifth speed 5TH, reduced rotation of the input shaft 50 through the second planetary-gear set 30 is input to the large-diameter sun gear 11 through the third clutch 80, whereas non-reduced rotation of the input shaft 50 through the second clutch 70 is input to the carrier 14. Rotation of the ring gear 17 slightly increased with respect to rotation of the input shaft 50 is output to the counter drive gear 170.

The sixth speed 6TH is achieved by engagement of the second clutch 70 and the first brake 100. At the fifth speed 6TH, non-reduced rotation of the input shaft 50 through the second clutch 70 is input to the carrier 14 only. Receiving a reaction from the large-diameter sun gear 11 fixed to the transmission casing 180 by engagement of the first brake 100, further increased rotation of the ring gear 17 is output to the counter drive gear 170.

The reverse REV is achieved by engagement of the third clutch 80 and the second brake 110. At the reverse REV, reduced rotation of the input shaft 50 through the second planetary-gear set 30 is input to the large-diameter sun gear 11 through the third clutch 80. Receiving a reaction from the carrier 14 fixed to the transmission casing 180 by engagement of the second brake 110, reverse rotation of the ring gear 17 is output to the counter drive gear 170.

Figure 4:
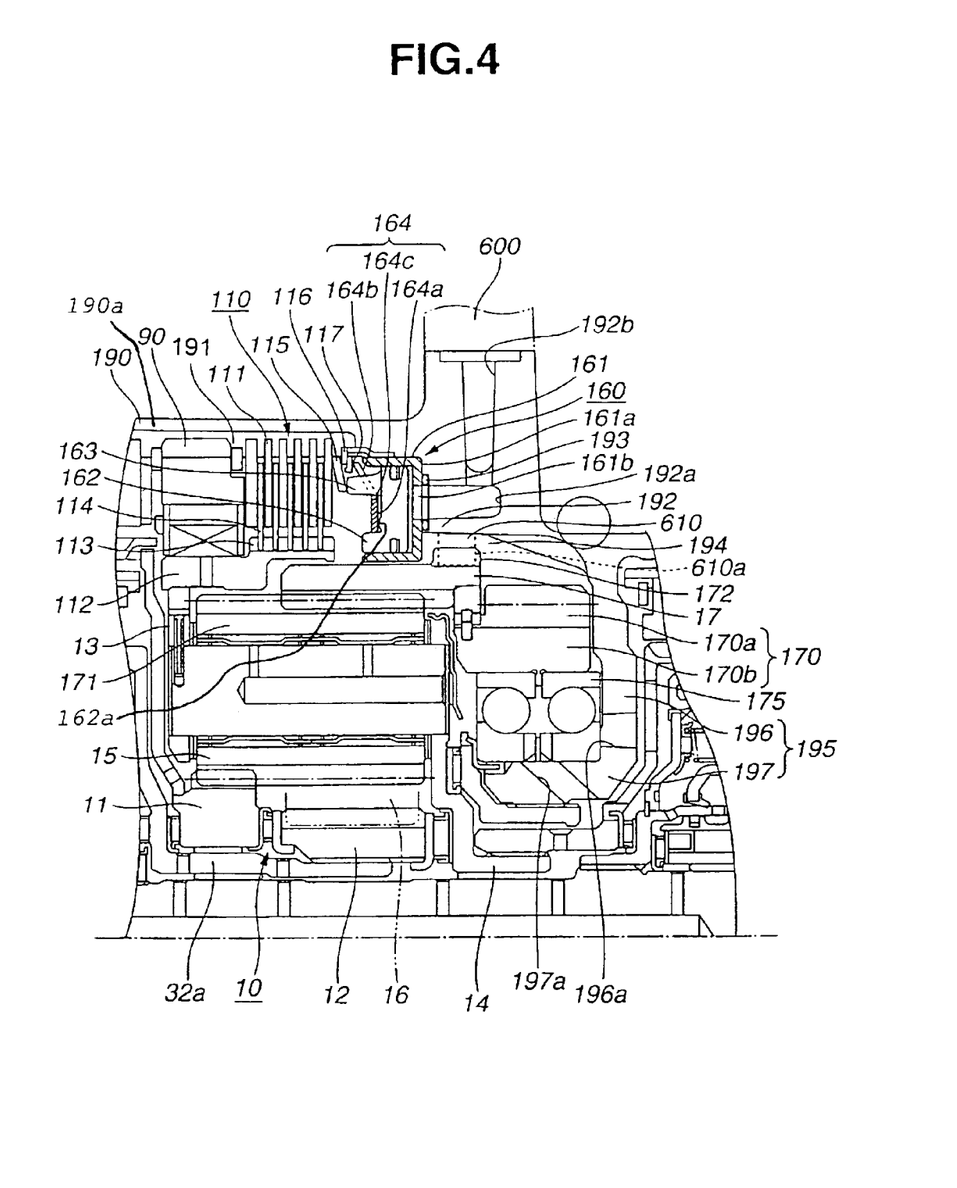
FIG. 4 is an enlarged fragmentary section showing the automatic transmission.

The foregoing is the general constitution of the automatic transmission to which the present invention is applicable. In this embodiment, referring to FIG. 4, the second brake 110 as mechanism to be operated is arranged in the axial center of the inner periphery of the first shaft compartment 190a of the transmission casing 180. Specifically, as shown in FIG. 4, the intermediate partition 195 is arranged on the inner periphery of the casing main body 190 in the position close to the converter housing 231 (see FIG. 1) with respect to the axial center. The intermediate partition 195 comprises a roughly doughnut-like disk 196 integrally formed with the inner periphery of the casing main body 190, and a support cylinder 197 arranged at the inner peripheral edge of the disk 196 at a predetermined distance from the input shaft 50 to protrude backward coaxially. The disk 196 and the support cylinder 197 are formed with holes 196a, 197a serving as lubrication passages, respectively.

The counter drive gear 170 as output gear is rotatably arranged on the outer periphery of the support cylinder 197 of the intermediate partition 195 through the bearing 175. The first planetary-gear set 10 is disposed in the rear of the counter drive gear 170. The one-way clutch 90, the second brake 110, and the fifth hydraulic servomechanism 160 are disposed between the first planetary-gear set 10 and the inner periphery of the casing main body 190 and in order from the rear.

As shown in FIG. 4, a coupling member 32a coupled to the ring gear 32 of the second planetary-gear set 30 is rotatably provided to the input shaft 50. The first planetary-gear set 10 is of the Ravigneaux type, comprising large-diameter sun gear 11 rotatably arranged at the outer periphery of the coupling member 32a and coupled to the third clutch 80 and the first brake 100, small-diameter sun gear 12 spline-connected to the coupling member 32a, long pinion 15 meshed with the large-diameter sun gear 11, short pinion 16 meshed with the small-diameter sun gear 12, carriers 13, 14 for supporting the pinions 15, 16, and ring gear 17 meshed with the inner teeth of the ring gear 17.

The counter drive gear 170 as output gear comprises a teeth portion 170a formed on the outer periphery and a base portion 170b arranged inside the teeth portion 170a. The base portion 170b is coupled to a pinion gear 171 meshed with the ring gear 17 of the first planetary-gear set 10 for unitary rotation with the ring gear 17.

The second brake 110 is disposed opposite to and outside the ring gear 17 of the first planetary-gear set 10 and the pinion gear 171, and are of the friction multiplate structure comprising a plurality of driven plates or stop-side friction plates 111 each having a protrusion engaged with a spline 191 formed in the inner periphery of the casing main body 190 and a plurality of drive plates or rotation-side friction plates 114 each having a protrusion engaged with a spline 113 formed in the outer periphery of a brake hub 112 coupled to the carrier 13 of the first planetary-gear set 10, wherein the driven plates 111 and the drive plates 114 are disposed alternately.

The rearmost driven plate 111 abuts on a front end of the one-way clutch 90 adjacent to the rear thereof to have restricted backward movement. The foremost driven plate 111 abuts on a dish plate 115 which in turn abuts on a snap ring 116 fixed on the inner periphery of the casing main body to have restricted forward movement.

As shown in FIG. 4, the fifth hydraulic servomechanism 160 for controlling operation of the second brake 110 comprises an annular C-shaped section cylinder 161 having a front-end outer periphery abutting on a stepped portion 192 formed on the inner periphery of the casing main body 190 to protrude inward, a piston 162 slidably arranged in the cylinder 161, a plurality of pressing portions 163 protruding from the piston 162 backward circumferentially equiangularly to abut on the dish plate 115, and a return spring 164 comprising a leaf spring and interposed between the piston 162 and the snap ring 116 for biasing the piston 162 forward.

The cylinder 161 includes a front-end plate 161a which abuts on the stepped portion 192 of the casing main body 190 and a hydraulic-oil or fluid supply/discharge port 161b formed in the plate 161a in the position slightly exterior of the radial center of the side face of the casing main body 190. The stepped portion 192 opposite to the hydraulic-oil supply/discharge port 161b is formed with a hydraulic-oil passage 192a extending axially and a hydraulic-oil passage 192b extending outward from the rear thereof to open outside. An O-ring 193 is arranged in the hydraulic-oil passage 192a on the end face on the side of the cylinder 161, whereas a control valve 600 is arranged in the hydraulic-oil passage 192b at an open end thereof.

Figure 5:
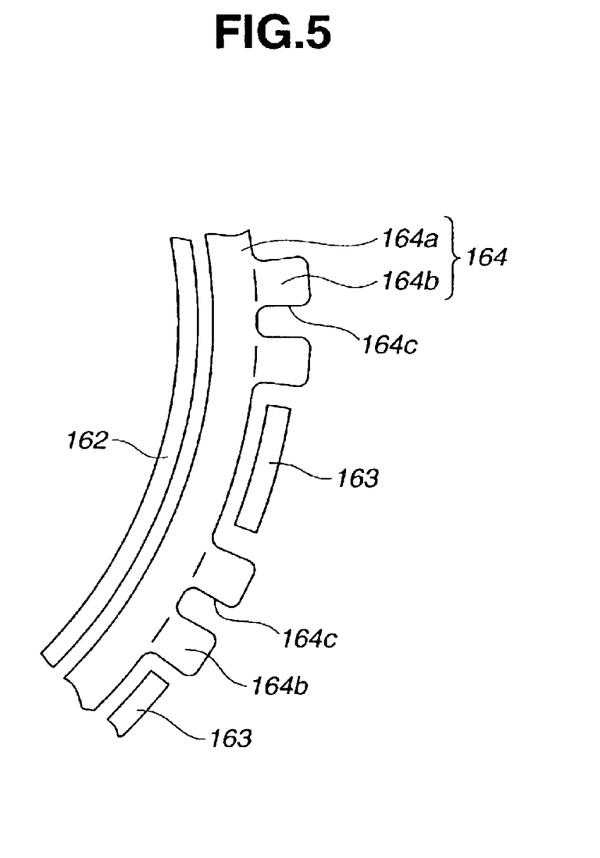
FIG. 5 is a fragmentary front view showing a return spring.

Referring also to FIG. 5, the return spring 164 is formed like a disk, and comprises an annular portion 164a having a radial flat surface and a plurality of inclined leaf-spring portions 164b as cantilevers protruding from the outer peripheral edge of the annular portion 164a slantly outward backward and circumferentially equiangularly in such a way as to allow insertion of the pressing portions 163 of the piston 162. A spring-load adjusting recess 164c is formed in the inclined leaf-spring portion 164b in the circumferential center to extend from the outer peripheral edge to the inside.

The return spring 164 brings the inner peripheral edge of the annular portion 164a into contact with a protrusion 162a formed on the rear end face of the piston 162, inserts the pressing portions 163 into clearances between the inclined leaf-spring portions 164b, and brings a front end of the inclined leaf-spring portions 164b into contact with a stopper ring 117 abutting on a front end of the snap ring 116. The recess 164c serves to adjust a spring load of the inclined leaf-spring portions 164b, which can be controlled by varying the cutting width.

The stepped portion 192 for supporting the cylinder 161 of the hydraulic servomechanism 160 has an inner periphery located outside the inner periphery of the cylinder 161 and having the radial length shorter than that of the cylinder 161 (about 5/7, for example). A space 194 is formed at the inner periphery of the stepped portion 192, and a parking gear 172 formed in the outer periphery of the pinion gear 171 at the front end is disposed therein. When selecting the parking range P with a select mechanism, not shown, a teeth portion 610a of a parking pole 610 is meshed with the parking gear 172 to prevent rotation of the pinion gear 171 and the counter drive gear 170 as output gear coupled thereto. When selecting the other range than the parking range P, the teeth portion 610a of the parking pole 610 is separated outward of the parking gear 172 to allow free rotation of the pinion gear 171 and the counter drive gear 170 coupled thereto.

In this embodiment having the above constitution, when the vehicle is at a standstill, and the parking range P is selected with the select mechanism, the teeth portion 610a of the parking pole 610 is meshed with the parking gear 172 formed on the outer periphery of the pinion gear 171 to prevent rotation of the pinion gear 171, the ring gear 17, and the counter drive gear 170 as output gear, achieving the parking state with output rotation not transferred from the automatic transmission.

In the parking state, when selecting the reverse range R with the select mechanism, the teeth portion 610a of the parking pole 610 is separated outward of the parking gear 172 to allow free rotation of the pinion gear 171, the ring gear 17, and the counter drive gear 170 as output gear, wherein the fifth hydraulic servomechanism 160 is controlled in operation by the control valve 600.

Specifically, the control valve 600 provides hydraulic oil of a predetermined pressure, which is supplied through the hydraulic-oil passages 192b, 192a of the casing main body 190 and the hydraulic-oil supply/discharge port 161b of the front-end face 161a of the cylinder 161 of the fifth hydraulic servomechanism 160 to a hydraulic chamber defined by the cylinder 161 and the piston 162. In accordance with this, the piston 162 is moved leftward against the return spring 164 to push the dish plate 115 through the pressing portions 163, having the drive plates 114 held by the driven plates 111. This puts the second brake 110 in engagement to fix the carrier 13 of the first planetary-gear set 10 to the casing main body 190. Simultaneously, the control valve 600 supplies hydraulic oil of a predetermined pressure to the third hydraulic servomechanism 130. This puts the third clutch 80 in engagement to rotate the drive shafts 453a, 453b of the differential gear 450 in the reverse direction, achieving backward run of the vehicle.

In backward run of the vehicle, when stopping the vehicle and selecting the drive range D with the select mechanism, a valve in the control valve 600 is switched to discharge hydraulic oil within the hydraulic chamber defined by the cylinder 161 and the piston 162 of the fifth hydraulic servomechanism 160 to the inside of the control valve 600 through the hydraulic-oil supply/discharge port 161b and the hydraulic-oil passages 192a, 192b of the casing main body 190. With this, the piston 162 is moved forward by a resilient force of the return spring 164 to release pressing of the dish plate 115 by the pressing portions 163, releasing holding of the drive plates 114 by the driven plates 111, thus returning the second brake 110 to non engagement.

With this, as described above, the first clutch 60 and the one-way clutch 90 are both in engagement to achieve the first speed. In this state, when depressing an accelerator pedal in place of a brake pedal, the vehicle runs forward. And as the vehicle speed increases, the speed ratio is switched to the second speed, then to the third speed. Subsequently, when the vehicle is decelerated to return the speed ratio to the first speed, at which it is being coasting with an engine brake active, hydraulic oil with a predetermined pressure is supplied from the control valve 600 to the hydraulic chamber defined by the cylinder 161 and the piston 162 of the fifth hydraulic servomechanism 160 through the hydraulic-oil passages 192b, 192a and the hydraulic-oil supply/discharge port 161b in the same way as at the above backward run, controlling the second brake 110 in engagement.

Then, after stopping the vehicle by depressing the brake pedal, the parking range P is selected with the select mechanism. With this, the teeth portion 610a of the parking pole 610 is meshed with the parking gear 172 to prevent rotation of the pinion gear 171, the ring gear 17, and the counter drive gear 170 as output gear, achieving the parking state with output rotation not transferred from the automatic transmission.

In such a way, in this embodiment, when the reverse range R is selected with the select lever and when the first speed is selected and the vehicle is being coasting with an engine brake active, the second brake 110 is controlled in engagement. The pressing portions 163 of the piston 162 directly abuts on the dish plate 115 through the clearances between the inclined leaf-spring portions 164b, so that when hydraulic oil with a predetermined pressure is supplied from the control valve 600 to the hydraulic chamber defined by the cylinder 161 and the piston 162 so as to start leftward movement of the piston 162, the dish plate 115 is pressed concurrently with start of leftward movement of the piston 162 to have the drive plates 114 held by the driven plates 111, allowing noticeable enhancement in the response characteristic of brake engaging operation compared with the earlier art.

A spring load of the return spring 164 at engagement of the second brake can be adjusted by controlling the cutting width of the recess 164c formed in the inclined leaf-spring portion 164b. Specifically, when the cutting width of the recess 164c is smaller, a greater spring load can be obtained at the inclined leaf-spring portion 164b, whereas when the cutting width is larger, a smaller spring load can be obtained at the inclined leaf-spring portion 164b. Instead of adjusting the cutting width of the recess 164c, a spring load of the return spring 164 may be adjusted by forming the recess 164c with circumferential slits and controlling the number thereof. Optionally, a spring load of the return spring 164 can be adjusted by controlling the circumferential width or the thickness of the inclined leaf-spring portion 164b.

In the illustrative embodiment, the hydraulic-oil passages 192a, 192b intersecting at right angles are formed through the stepped portion 192. Alternatively, one or both of the hydraulic-oil passages 192a, 192b may be formed slantly with respect to the axial or radial direction, i.e. on condition that communication is allowed between the hydraulic-oil supply/discharge port 161b of the cylinder and the control valve 600.

Moreover, in the illustrative embodiment, the return spring 164 comprises annular portion 164a arranged at the inner periphery and inclined leaf-spring portion 164b arranged at the outer periphery. Alternatively, the return spring 164 may comprise annular portion 164a arranged at the outer periphery to abut on the snap ring 116 and inclined leaf-spring portion 164b arranged at the inner periphery to abut on the piston 162.

Further, in the illustrative embodiment, the mechanism to be actuated is second brake 110. Alternatively, the mechanism to be actuated may be first brake 100 and first, second and third clutches 60, 70, 80 to apply the present invention to the return springs for the first, second, third and fourth servomechanisms 120, 130, 140, 150.

Furthermore, in the illustrative embodiment, the automatic transmission comprises a gear train for achieving six forward speeds. Alternatively, the transmission may be of five forward speeds or less or seven forward speeds or more.

Having described the present invention with regard to the preferred embodiment, it is noted that the present invention is not limited thereto, and various changes and modifications can be made without departing from the scope of the present invention.

The entire teachings of Japanese Patent Application P2001-303908 filed Sep. 28, 2001 are incorporated hereby by reference.

What is claimed is:

1. A structure for an automatic transmission wherein a mechanism is arranged in a casing having an inner periphery formed with a spline, the structure comprising:

a cylinder;

a piston slidably arranged in the cylinder, the piston actuating the mechanism;

a return spring that biases the piston, the return spring comprising an annular portion abutting on the piston and a plurality of leaf-spring portions protruding outward equiangularly from an outer periphery of the annular portion and having a front end which abuts on a stopper ring engaged with the spline of the casing; and a plurality of pressing portions formed with the piston, the pressing portions abutting on the mechanism through clearances between the leaf-spring portions of the return spring.

2. The structure as claimed in claim 1, wherein the return spring has a spring characteristic which is controlled by adjusting one of a width, a thickness, and an recessed area of each leaf-spring portion.

3. An automatic transmission, comprising:

a casing having an inner periphery formed with a spline;

a mechanism arranged in the casing;

a cylinder;

a piston slidably arranged in the cylinder, the piston actuating the mechanism;

a return spring that biases the piston, the return spring comprising an annular portion abutting on the piston and a plurality of leaf-spring portions protruding outward equiangularly from an outer periphery of the annular portion and having a front end which abuts on a stopper ma engaged with the spline of the casing; and a plurality of pressing portions formed with the piston, the pressing portions abutting on the mechanism through clearances between the leaf-spring portions of the return spring.

4. The automatic transmission as claimed in claim 3, wherein the return spring has a spring characteristic which is controlled by adjusting one of a width, a thickness, and an recessed area of each leaf-spring portion.

5. A structure for an automatic transmission wherein a mechanism is arranged in a casing having an inner periphery formed with a spline, the structure comprising:

a cylinder;

a piston slidably arranged in the cylinder, the piston configured to actuate the mechanism;

a return spring that biases the piston, the return spring comprising an annular portion abutting on the piston and a plurality of leaf-spring portions protruding outward equiangularly from an outer periphery of the annular portion and having a front end coupled to the spline of the casing, the return spring having a spring characteristic which is controlled by adjusting one of a width, a thickness, and an recessed area of each leaf-spring portion; and a plurality of pressing portions formed with the piston, the pressing portions abutting on the mechanism through clearances between the leaf-spring portions of the return spring.

* * * * *